United States Patent [19]

Zocholl

[11] 4,315,295
[45] Feb. 9, 1982

[54] TIMING CIRCUIT FOR AN OVERCURRENT RELAY

[75] Inventor: Stanley E. Zocholl, Holland, Pa.

[73] Assignee: Gould Inc., Rolling Meadows, Ill.

[21] Appl. No.: 104,199

[22] Filed: Dec. 17, 1979

[51] Int. Cl.³ ............................................... H02H 3/093
[52] U.S. Cl. ...................................... 361/96; 361/94; 361/97; 307/603
[58] Field of Search ................. 361/96, 94, 97, 98, 361/95, 89, 195, 196, 198; 307/293, 294, 597, 602, 603; 328/185

[56] References Cited

U.S. PATENT DOCUMENTS

| | | | |
|---|---|---|---|
| 3,319,127 | 5/1967 | Zocholl et al. | 361/96 |
| 3,327,171 | 6/1967 | Lipnitz et al. | 361/97 X |
| 3,413,496 | 11/1968 | Baude | 361/94 X |
| 3,573,555 | 4/1971 | Lipnitz | 361/94 |
| 4,149,210 | 4/1979 | Wilson | 361/96 X |

*Primary Examiner*—Reinhard J. Eisenzopf
*Attorney, Agent, or Firm*—Ostrolenk, Faber, Gerb & Soffen

[57] ABSTRACT

A timing circuit for use in an overcurrent relay is disclosed. A plurality of non-interacting R-C circuits whose outputs are summed is provided. The signal representing the summed outputs of the R-C circuits represents one term of the inverse time-current relation it is desired to emulate. Each time the summed signal reaches a predetermined level, a pulse is generated. The frequency of the pulses determines the length of a time delay before the protected circuit is interrupted. When it is necessary to take the second term of the time-current relation into account, this can be done by providing a multivibrator that emits pulses of an adjustable duration responsive to the summed signal and that itself triggers the generation of the pulse train constituting the timing circuit output.

15 Claims, 4 Drawing Figures

TIMING CIRCUIT FOR AN OVERCURRENT RELAY

BACKGROUND OF THE INVENTION

This invention pertains generally to overcurrent relay circuits and pertains particularly to timing circuits for overcurrent relay circuitry to be used with a small signal input, e.g. in the millivolt range.

The purpose of an overcurrent relay circuit is to trip an interrupter when the current in a circuit to be protected rises to levels potentially dangerous to the components in the circuit. In order to ensure that interruption does not occur accidentally, but only when an overcurrent condition arises and persists long enough to expose the circuitry to damage, it is common to provide such relay circuitry with a time delay, so that the protected circuit is interrupted only if the overcurrent condition persists a certain minimum time. The required overcurrent duration varies inversely with the severity of the overcurrent condition. Examples are to be found in U.S. Pat. No. 3,319,127, to Zocholl et al., and U.S. Pat. No. 3,327,171, to Lipnitz et al., both assigned to the assignee of the present application. One means of using a multinode R-C circuit to produce the required time delay is disclosed in applicant's copending application Ser. No. 949,015, filed Oct. 6, 1978, entitled SOLID STATE RELAY, and assigned to the assignee of the present application, now U.S. Pat. No. 4,259,706. The disclosure of the cited copending application is incorporated herein by reference.

Timing circuits designed to provide the necessary time delay, as exemplified by the cited patents and copending application, contain a number of capacitors whose values are related to each other in a manner dictated by the mathematical relation it is desired should exist between the severity of the overcurrent condition and the length of the time delay before interruption. In order for the timing circuits to emulate the chosen relation accurately, capacitors having precisely the correct values must be used. This generally requires the use of non-standard values of capacitance, which greatly increases the cost of such circuitry.

SUMMARY OF THE INVENTION

It is the principal object of this invention to provide a novel timing circuit constructed of capacitances of standard values.

It is another object to provide a novel timing circuit that will adhere closely to the desired inverse time-current function.

It is another object of the present invention to provide a novel timing circuit that can easily adjusted to operate according to either a so-called "very inverse" or a so-called "extremely inverse" time-current characteristic.

These objects are attained according to the present invention by means of a timing circuit comprising two or more non-interacting R-C circuits, the outputs of which are summed. The signal representing this sum depends on the peak current in the circuit being protected and closely emulates the the first of the two terms of the expression:

$$t = T_1/(M^2 - 1) + T_0 \quad \text{(Equation 1)}$$

where t is the time delay to be provided, M is the ratio of the timing circuit input current (which is representative of the instantaneous peak current in the protected circuit), and To and Tl are parameters. For very small signal operation, the second term, To, can be ignored, as will be explained below. In this case, the signal representing the sum of the R-C outputs can be used to represent the time-current function. The summed signal, upon reaching a predetermined value, activates a one-shot multivibrator to generate a short pulse. The frequency of the pulses so emitted varies depending on the severity of the overcurrent condition.

When the second term of the time-current relation is too large to be ignored, however, it can be taken into account by means of a second one-shot multivibrator connected in series between the first multivibrator and the R-C signal summer. The second multivibrator generates a pulse of adjustable duration, the falling edge of which activates the first multivibrator. In this manner, the second multivibrator is actuated after a period of time that represents the first, more significant term of the time-current relation, i.e. after the summed signal reaches a predetermined value, and the other multivibrator, which generates the output of the timing circuit of the invention, is activated a short time To later corresponding to the second term of the relation.

For the purpose of illustrating the invention, there is shown in the drawings an embodiment which is presently preferred; it is to be understood, however, that the invention is not limited to the precise arrangements and instrumentalities shown.

DETAILED DESCRIPTION OF THE INVENTION

Figure 1:
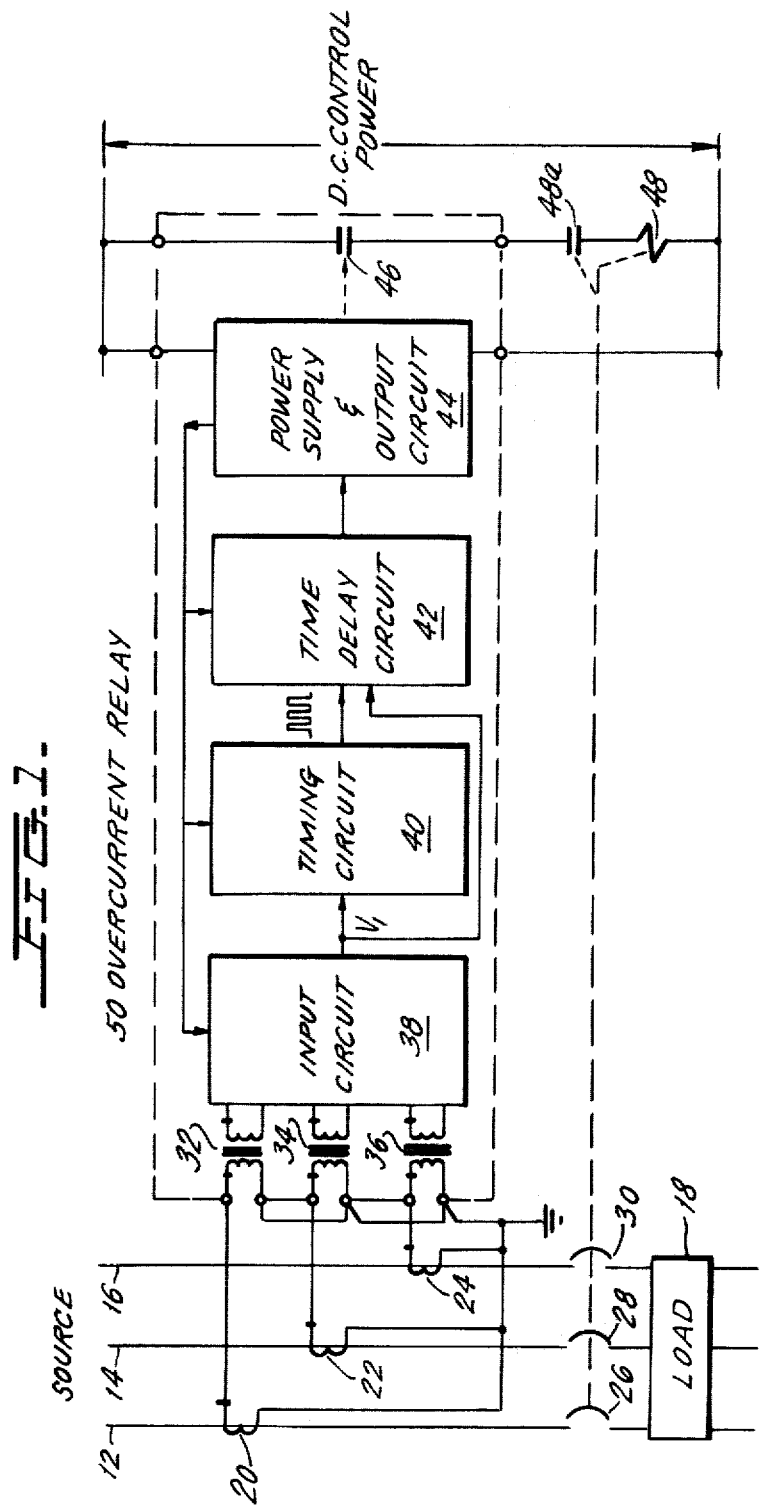
FIG. 1 is a block diagram of a solid state overcurrent relay according to the present invention.

Referring now to the Figures, in which like reference numerals refer to like elements, FIG. 1 is a block diagram of the overcurrent relay timing circuit 50 according to the present invention, showing its relation to the circuit it is to protect against overcurrents. The latter is a three-phase system including three lines 12–16 providing power to a load 18. Each of the three lines 12–16 is provided with a sensing coil 20–24 (a current transformer) to detect overcurrents and an interrupter 26–30 to open it in the event of a sufficiently serious overcurrent. The output of each of the sensing coils 20–24 is input to a respective input transformer 32–36. The outputs from the secondaries of the transformers 32–36 are input to the input circuit 38, which generates a signal $V_1$ whose magnitude is proportional to the highest current detected in any of the lines 12–16 at a given instant over a first selected reference voltage. The signal $V_1$ is input to the timing circuit 40, which produces a train of pulses whose frequency is proportional to the magnitude of the signal $V_1$. The train of pulses is input to a time delay circuit 42, which counts the number of such pulses generated while $V_1$ remains above another reference value and, if that number is sufficiently high, actuates an output circuit 44 to interrupt the current in lines 12-16. This is done by closing switch 46, normally open, thus energizing trip coil 48, which operates the line interrupters 26-30, as is shown schematically in FIG. 2 by the broken line joining relay 48 to interrupters 26-30. At the same time, auxiliary contact 48a is opened to interrupt the trip coil current.

Power supply and output circuit 44 also provides power at set positive and negative voltages +VREF and −VREF to input, timing and time delay circuits 38-42.

A timing circuit of the type commonly used in overcurrent relays typically includes one or more R-C circuits the capacitors of which, in the aggregate, charge and discharge in a manner described by a time-current characteristic curve of the form:

$$t = (T1/(M^2 - 1)) + T \quad \text{(Equation 1)}.$$

Figure 2:
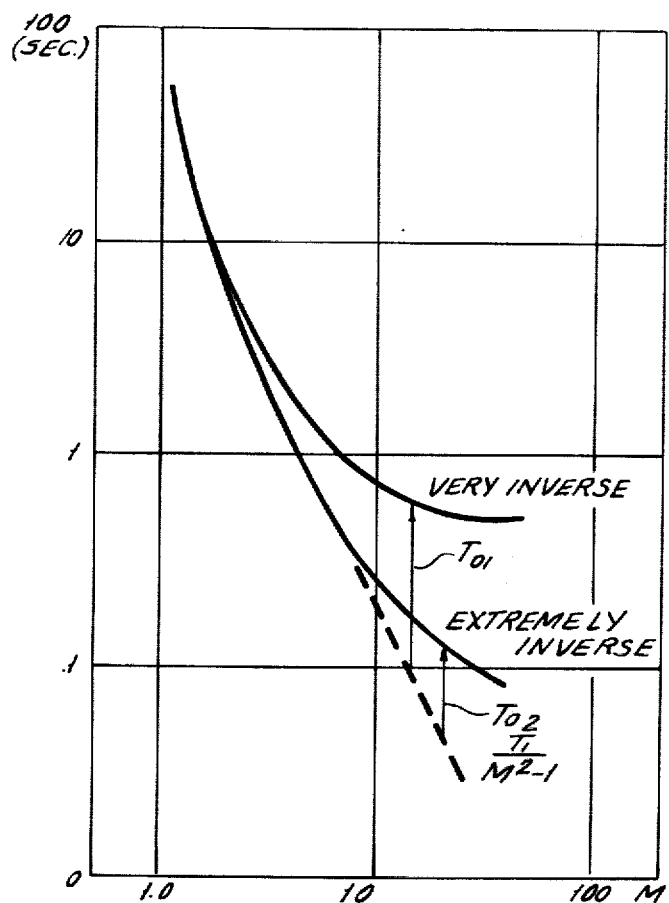
FIG. 2 is a logarithmic graph of the time-current characteristic curves and, for comparison, of the function $T_1/(M^2 - 1)$.

Two widely used characteristic curves are the so-called "very inverse" and "extremely inverse" time-current characteristics, obtained from induction disk type electromechanical overcurrent relays. FIG. 2 shows graphs of these two types of characteristic curves. For comparison, the first term of the right-hand of Equation 1 is also shown in FIG. 2 by the broken line. As can be seen from the graph, these three curves are substantially identical for relatively small values of M, diverging from each other substantially only for values of M above about 2. The difference between the ordinates of two of these curves, as can be seen from Equation 1, is simply the difference between the respective values of the parameter $T_0$ corresponding to the curves in question. In the curves of FIG. 2, $T_1$ has been taken as 20 seconds. $T_0$ for a very inverse curve is 0.5 second, while $T_0$ for the extremely inverse curve is taken as 0.08 second.

As explained below, the output of the timing circuit 40 of the present invention is held at a constant value except for short pulses at a second, higher fixed voltage. The input of the timing circuit, however, varies considerably. Hereinafter the symbol M will represent the ratio of the lower fixed output voltage of the timing circuit 44 to the (varying) input voltage thereof. Neglecting the relatively short time $T_0$, it is possible to derive the following expression for (1/M) from Equation 1:

$$(1/M) = (t/(T_1 + t))^{\frac{1}{2}} \quad \text{(Equation 2)}.$$

As is shown by FIG. 2, it is possible to neglect the relatively small parameter $T_0$ in this manner precisely because the various time-current characteristic curves of the form given by Equation 1 differ substantially from each other for relatively large values of M.

It can be shown that the right-hand side of Equation 2 can be approximated by the following equation:

$$(1/M) = 1 - A_1 \exp(-t/T_1) - A_2 \exp(-t/T_2) - A_3 \exp(-t/T_3) \quad \text{(Equation 3)}$$

where $T_2$ and $T_3$ are additional positive parameters, and $A_1$, $A_2$ and $A_3$ are positive coefficients whose sum is equal to one. Equation 3 is simply the response function of a three-node R-C circuit. Such a circuit, accordingly, if constructed with components of proper magnitude, will have a time current characteristic of the form of Equation 2 and can thus be used in the timing circuit of an overcurrent relay wherein M remains small, i.e. in small signal operation. As a result, in small signal operation, a timing circuit can be provided using only standard-size components, as will be explained below, at a considerable saving in cost. Moreover, as will also be explained below, the same advantage can be realized by means of the present invention even if $T_0$ is not negligible.

Figure 3:
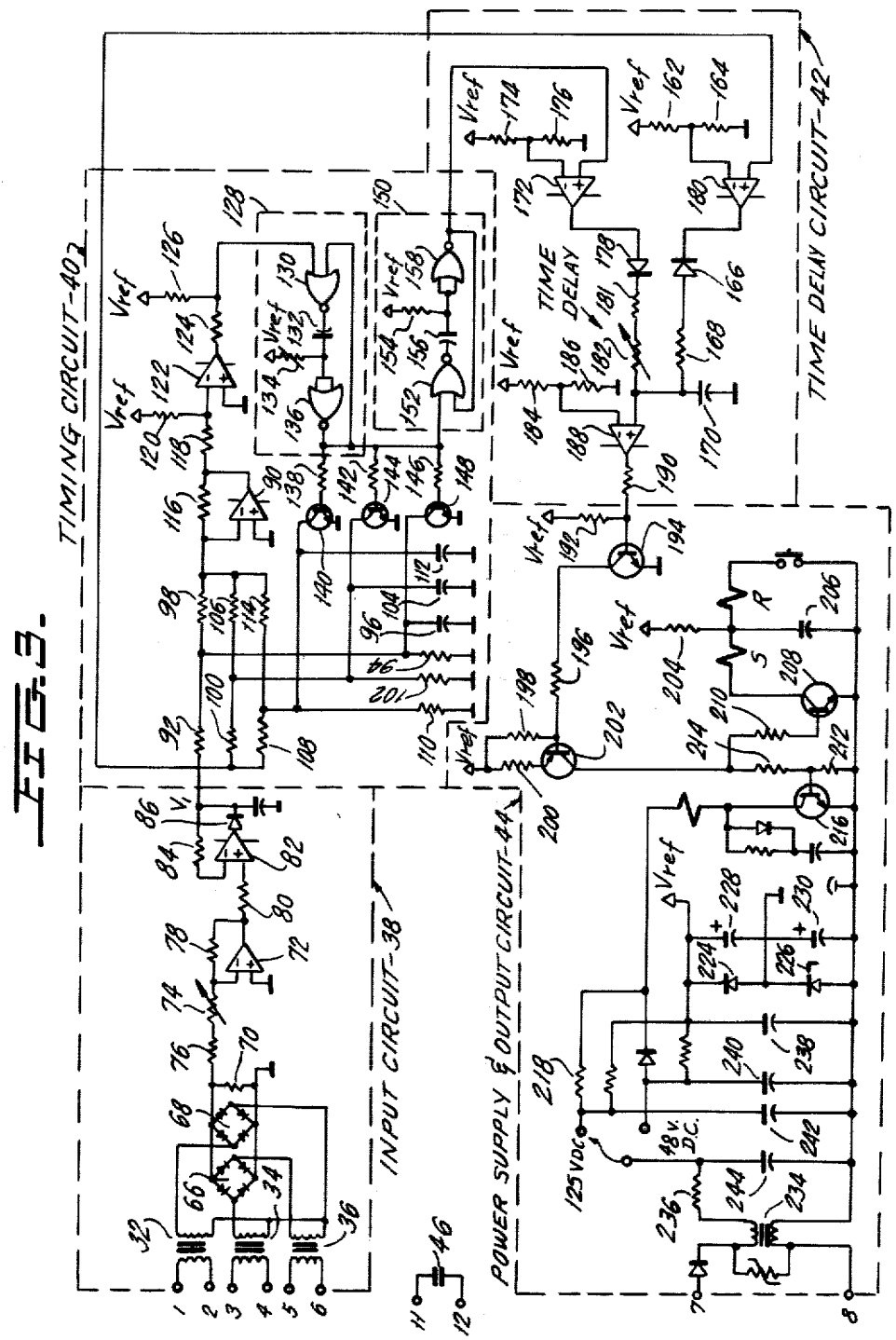
FIG. 3 is a detailed circuit diagram of the relay of the present invention according to one preferred embodiment containing three independent R-C circuits in the timing circuit.

FIG. 3 shows the complete circuit diagram of one embodiment of the overcurrent relay of the present invention. As FIG. 1 shows, the overcurrent relay circuit 50 comprises an input circuit 38, a timing circuit 40, a time delay circuit 42 and a power supply and output circuit 44.

IN INPUT CIRCUIT

The small signal input circuit includes three input transformers 32-36, each of which receives a signal from a respective current transformer 20-24 associated with a respective one of the three lines 12-16 of the three-phase circuit to be protected. The output from the three transformers 32-36 is rectified by diode bridges 66, 68, the output from which appears across burden resistor 70. The voltage appearing across resistor 70 is representative of the highest instantaneous current in the three lines 12-16. A given value of input current causes inverting amplifier 72, the gain of which is controlled by means of variable resistor 74 cooperating with a second amplifier 82, to output a signal $V_1$.

THE TIMING CIRCUIT

The preferred embodiment of the novel timing circuit 40 of the present invention is a three-node R-C circuit. This actually comprises three independent R-C circuits the output of which are summed by inverting amplifier 90. Each of the three R-C circuits comprises, essentially, two resistors forming a voltage divider feeding a grounded capacitor. The output of each capacitor is input to the inverting amplifier 90 by a respective summing resistor. In FIG. 3, one R-C circuit consists of the voltage divider formed by resistors 92 and 94, the latter of which is grounded and shunted by capacitor 96. The voltage appearing across capacitor 96 is fed via summing resistor 98 to inverting amplifier 90. Similarly, resistors 100, 102 and 106 and capacitor 104 constitute a second R-C circuit, and resistors 108, 110 and 114 and capacitor 112 constitute the third.

It should be noted that since the inverting terminal of the inverting amplifier 90 is a virtual ground, summing resistors 98, 106, 114 are in effect in parallel with resistors 94, 102, 110, respectively. By virtue of this feature, each of the three R-C circuits is isolated from the others.

As a result of the independence of the three R-C circuits, the values of the capacitors 96, 104, 112 can be selected completely independently of each other, allowing capacitors of standard sizes to be employed without impairing the accuracy of the timing circuit 40. Since custom-made components of special sizes are thus not required in the timing circuit 40 of the present invention, the cost of this circuit is greatly reduced.

Once the values of capacitors 96, 104, 112 are selected according to convenience, the values of the resistors in the three R-C circuits are restricted by the following equations:

$$R_{92} = (T_1/A_1)(1/C_{96}) \quad \text{(Equations 4)}$$

-continued $$X = (A_1/(1 - A_1))R_{92}$$

$$R_{94} = R_{98}X / (R_{98} - X)$$

$$R_{100} = (T_2/A_2)(1/C_{104})$$

$$Y = (A_2/(1 - A_2)) R_{100}$$

$$R_{102} = R_{106}Y / (R_{106} - Y)$$

$$R_{108} = (T_3/A_3)(1/C_{112})$$

$$Z = (A_3/(1 - A_3))R_{108}$$

$$R_{110} = R_{114}Z/(R_{114} - Z).$$

In Equations 4, X, Y and Z are merely employed to simplify the appearance of the expressions for the values of the various resistors, and the letters R and C followed by a number refer to the values of the resistors and the capacitors, respectively, having the numeral in question as a reference number.

When the values of summing resistors 98, 106, 114 are selected to be equal, the circuit response at the output of inverting amplifier 90 is that of Equation 3 multiplied by a gain factor of $(-R_{116}/R_{114})$.

As can be seen from the foregoing, the voltage at the output of the inverting amplifier 90 follows the time-current characteristic curve shown by the broken line in FIG. 2. This voltage is then used to generate a series of pulses whose frequency is a function of the instantaneous peak current in the lines 12-16.

To this end, the output from amplifier 90 is fed by a resistor 118 to comparator 122 and compared thereby to a positive reference current in resistor 120. When the output of amplifier 90 is less than the current set by the reference voltage VREF, the output of comparator 122 is negative. In this situation, resistors 124, 126 form a voltage divider with the high-voltage end of resistor 126 at +VREF, the low-voltage end of resistor 124 at −VREF, and their junction at 0. When the output of amplifier 90 reaches the reference, the output of comparator 122 becomes positive, causing the junction of resistors 124, 126 to go positive. The voltage at this junction is input to a one-shot multivibrator 128. This multivibrator 128 consists of two NOR gates 130, 136 in series separated by an R-C circuit including capacitor 132, which is in series with both NOR gates, and variable resistor 134, whose free end is at reference voltage VREF. The one-shot multivibrator 128 produces, responsive to the positive signal from the junction of resistors 124 and 126, a pulse of duration To, determined by the value at which variable resistor 134 is set, which turns on transistors 140, 144, 148, across which R-C circuit capacitors 96, 104, 112 then respectively discharge. The pulse output by multivibrator 128 also energizes a second one-shot multivibrator 150, whose construction is identical to that of multivibrator 128, except that the resistor 154 of the second multivibrator 150 is of a fixed value. The pules generated by the second multivibrator 150 are the output of timing circuit 40 and are input to time delay circuit 42.

Figure 4:
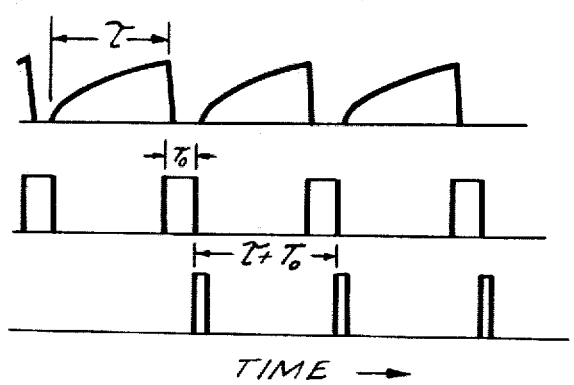
FIG. 4 is a timing chart showing voltage waveforms obtained at various nodes in the timing circuit.

Typical waveforms generated by the timing circuit 40 are shown in FIG. 4. FIG. 4a shows an inversion of the output of inverting amplifier 90. As the Figure indicates, the time during which the inverted output of amplifier 90 rises is $\tau = T1/(M^2 - 1)$. Once the output of amplifier 90 reaches a predetermined value, at time $t = \tau$, comparator 122 begins to produce a positive output, activating multivibrator 128, which emits a pulse of duration To (FIG. 4b). To is adjustable, since resistor 134 is variable. The falling edge of the pulse from multivibrator 128 activates multivibrator 150, which emits a short pulse of fixed duration at time $t = \tau + $To (FIG. 4c). This pulse is the output of timing circuit 40.

It should be noted that any convenient number of independent R-C circuits could be employed in the timing circuit 40 of the present invention.

THE TIME DELAY CIRCUIT

The time delay circuit 42 accumulates the pulses generated by the timing circuit 40 and energizes the power supply and output circuit 44 to interrupt the current in lines 12-16 when a predetermined number of pulses are output by timing circuit 40 within any period during which $V_1$ remains above a predetermined value.

The time delay circuit 42 has two inputs. The output of timing circuit 40 is input to comparator 172 for comparison to a first standard voltage provided by voltage divider 174, 176. In addition, voltage $V_1$ is input to one input terminal of comparator 180, which compares it with a second reference voltage set by voltage divider 162, 164. Normally, $V_1$ is less than the reference voltage it is compared to, so that comparator 180 is poled negative and diode 166 is forward-biased. As long as this is the case, current flows through diode 166 and capacitor 170 accumulates negative charge. When, $V_1$ exceeds the reference voltage to which it is compared, however, the output of comparator 180 becomes positive, back-biasing diode 166; in this condition, whenever timing circuit 40 outputs a pulse, it similarly drives the output of comparator 172 positive, forward biasing diode 178 and permitting the negative charge accumulated on capacitor 170 to discharge therethrough. Capacitor 170 is large enough that it discharges only a slight amount of its charge during any one pulse output by timing circuit 40. Thus, as long as voltage $V_1$ remains above its reference voltage, the charge on capacitor 170 diminishes somewhat each time the timing circuit 40 emits the pulse. The amount of discharge per pulse is determined by a fixed resistor 181 and variable resistor 182.

After a certain number of pulses, the voltage across capacitor 170 becomes greater than a third reference voltage, provided by voltage divider 184, 186, and the output of comparator 188 becomes positive and turns on transistor 194. This in turn energizes transistors 202 and 216, energizing relay K51. In addition, transistor 208 is energized by the current through transistor 202 and resistor 210, indicating that the overcurrent relay has been activated to interrupt lines 12-16. (This portion of the power supply and output circuit 44 is described in applicant's copending application Ser. No. 949,015, entitled SOLID STATE RELAY and filed Oct. 6, 1978, the disclosure of which is incorporated herein by reference.)

As can be seen from the foregoing, a predetermined number of pulses from timing circuit 40 occurring while voltage $V_1$ is above a predetermined value will cause the time delay circuit 42 to actuate the power supply and output circuit 44 to trip the interrupter relay.

POWER SUPPLY

The positive and negative d-c voltages necessary to operate the circuitry of the present invention are provided by dropping resistors 218-222, zener diodes 224, 226 and filter capacitors 228, 230.

The metal oxide varistor 232, bolan transformer 234, resistor 236 and capacitors 238-244 protect the power supply and relay circuitry 44 against transients.

Although a preferred embodiment of the invention has been described in detail, many modifications and variations thereof will now be apparent to one skilled in the art. Accordingly, the scope of the present invention is to be limited not by the details of the preferred embodiment herein described but only by the terms of the appended claims.

What is claimed is:

1. An overcurrent relay timing circuit, comprising:
   a plurality of non-interacting R-C circuits, each producing a respective signal; and
   summing means comprising an inverting amplifier for generating a first signal representative of the sum of said respective signal of said R-C circuits.

2. An overcurrent relay timing circuit, comprising:
   a plurality of non-interacting R-C circuits, each producing a respective signal; and
   means for generating a further signal representative of the sum of said respective signals of said R-C circuits;
   each of said R-C circuits comprising a resistor and a capacitor in series with one another and a second resistor shunting said capacitor.

3. The circuit of claim 2, wherein each of said R-C circuits further comprises a summing resistor having one end in electrical contact with the junction between said resistor and said capacitor in series.

4. An overcurrent relay timing circuit, comprising:
   a plurality of non-interacting R-C circuits, each producing a respective signal; and
   means for generating a further signal representative of the sum of said respective signals of said R-C circuits;
   means for generating a pulse responsive to said further signal being greater than a first predetermined value; each of said R-C circuits comprising a capacitor connector in parallel with a respective transistor; each of said capacitors discharging across its respective transistor approximately when said pulse generating means generates a pulse.

5. The circuit of claim 4, wherein said pulse generating means comprises a first and a second multivibrator, said second multivibrator being for generating said pulse and said first multivibrator being for turning said transistors on and for actuating said second multivibrator.

6. The circuit of claim 5, wherein said second multivibrator generates a pulse of adjustable duration.

7. The circuit of claim 5, 6, 2, or 4 wherein said timing circuit comprises at least three of said non-interacting R-C circuits.

8. An overcurrent relay circuit, comprising:
   (A) input circuit means for generating a first signal V1 representative of the peak instantaneous current in an electrical circuit to be protected by said overcurrent relay circuit;
   (B) timing circuit means for generating a series of pulses whose period is representative of the magnitude of said first signal, said timing circuit means comprising:
      (1) a plurality of non-interacting R-C circuits each producing a respective signal;
      (2) means for generating a second signal representative of the sum of said signals generated by said R-C circuits; and
      (3) means for generating a pulse responsive to said second signal's exceeding a second predetermined value;
   (C) time delay circuit means for counting said pulses generated by said timing circuit means whenever said first signal exceeds a third predetermined value and for generating a third signal when a predetermined number of said pulses have been counted; and
   (D) means for interrupting said electrical circuit to be protected responsive to said third signal.

9. The circuit of claim 8, wherein each of said plurality of R-C circuits comprises a resistor and a capacitor connected in series, each of said capacitors being connected in parallel with a respective shunt resistor.

10. The circuit of claim 9, wherein each of said R-C circuits further comprises a summing resistor having one end connected to the junction between said resistor and said capacitor connected in series.

11. The circuit of claim 8, wherein each of said capacitors is provided with respective circuit means across which it can discharge.

12. The circuit of claim 11, wherein said pulse generating means comprises first multivibrator means for activating said discharging means approximately when one of said pulses is generated.

13. The circuit of claim 12, wherein said pulse generating means further comprises second multivibrator means for generating said pulses, and wherein said first multivibrator means generates pulses of adjustable duration.

14. The circuit of claim 8, wherein the capacitors of said R-C circuits are standard value capacitors.

15. The circuit of any of claims 8-13, wherein said input circuit means is for generating said first signal responsive to a three-phase current in said circuit to be protected.

* * * * *